UNITED STATES PATENT OFFICE.

EDWIN O. BARSTOW AND JOSEPH A. CAVANAGH, OF MIDLAND, MICHIGAN, ASSIGNORS TO DOW CHEMICAL COMPANY, OF MIDLAND, MICHIGAN, A CORPORATION OF MICHIGAN.

METHOD OF MAKING LEAD ARSENATE.

1,228,516.  Specification of Letters Patent.  Patented June 5, 1917.

No Drawing.  Application filed August 2, 1916.  Serial No. 112,727.

*To all whom it may concern:*

Be it known that we, EDWIN O. BARSTOW and JOSEPH A. CAVANAGH, citizens of the United States, and residents of Midland, county of Midland, State of Michigan, have jointly invented a new and useful Improvement in Methods of Making Lead Arsenate, of which the following is a specification, the principle of the invention being herein explained, and the best mode in which we have contemplated applying that principle, so as to distinguish it from other inventions.

In the manufacture of lead arsenate, starting with lead monoxid (PbO), it has apparently been heretofore considered impossible to secure a complete reaction between such oxid and arsenic acid, directly or in the mass. It has accordingly been proposed to use a so-called catalytic agent consisting of either nitric acid or acetic acid, with the idea of forming thereby the corresponding lead salt, which in turn reacts with the arsenic acid to form lead arsenate. The added acid is thus again set free to attack more of the lead oxid, and will, of course, remain free at the completion of the reaction.

We have found that while difficulty is encountered in attempting to react directly between arsenic acid and ordinary litharge, the red form of lead monoxid, it is possible to secure entirely satisfactory results by using sublimed lead monoxid, which comes in the form of a light yellowish, fluffy powder, much bulkier than ordinary litharge. Having regard to the foregoing object, the invention then consists of the steps hereinafter fully described and particularly pointed out in the claim, the following description setting forth in detail one mode of carrying out the invention, such disclosed mode, however, constituting but one of various ways in which the principle of the invention may be used.

In carrying out our improved method or process, the arsenic acid may be obtained commercially or prepared by treating arsenious oxid in the presence of water with chlorin, as described in U. S. Letters Patent No. 1,169,114 issued to E. O. Barstow January 25, 1916. The present reaction is in effect identical with reaction XIII., as exhibited in Fig. 2 of the drawings of my aforesaid patent, viz.:—

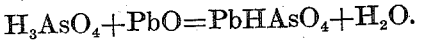

$$H_3AsO_4 + PbO = PbHAsO_4 + H_2O.$$

The present improvement, in other words, lies in the discovery that in order to secure the complete transformation of the lead oxid into the arsenate, using such reaction, it is advantageous that the above-described form of the monoxid be employed, any admixture of the red litharge being detrimental to a corresponding extent.

Where, however, the prescribed kind of oxid is utilized, we have found that not only does the reaction proceed promptly, but the transformation of the oxid is complete, and the resulting arsenate possesses the desired white color which has become accepted as an indication of purity among dealers and users.

In carrying out our improved method, the lead oxid is mixed with water and stirred, so as to be held in suspension, the mixture being thick enough to have a creamy consistency, and thereupon it is gradually fed into a solution of the arsenic acid, both being preferably at normal room temperature. As previously stated, the arsenic acid used should be chemically pure, or as nearly so as is commercially obtainable, it being understood that the more nearly absolute purity is realized, the more satisfactorily the reaction will proceed.

No heating of the mixture is required, in fact any approach to the temperature of boiling water will detrimentally affect the product, it being sufficient simply to stir the mixture until the reaction is complete. Thereupon the lead arsenate may be conveniently separated out by filtration, being then dried or else packaged in the form of paste, as desired.

Other modes of applying the principle of our invention may be employed instead of the one explained, change being made as regards the method herein disclosed, provided the step or steps stated by the following claim or the equivalent of such stated step or steps be employed.

We therefore particularly point out and claim as our invention:

The method of making lead arsenate which consists in directly reacting, in the presence of water, between arsenic acid and sublimed lead monoxid.

Signed by us, this 31st day of July, 1916.

EDWIN O. BARSTOW.
JOSEPH A. CAVANAGH.

Attested by—
WM. W. ROSS, Jr.,
MYRON E. ADAMS.